United States Patent Office 3,160,428
Patented Dec. 8, 1964

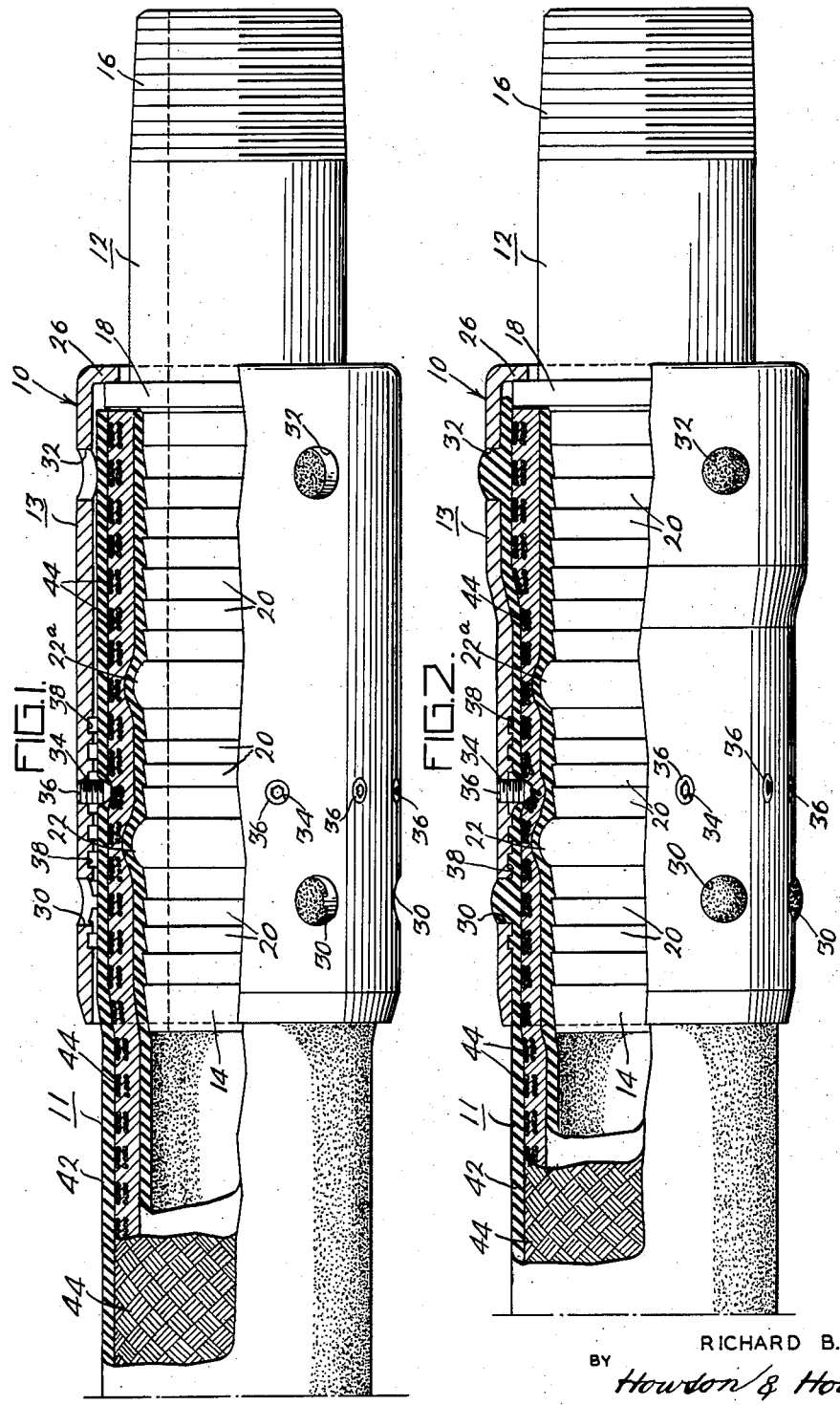

3,160,428
HOSE COUPLING HAVING A DEFORMED
FERRULE
Richard B. Goodall, Haverford, Pa., assignor to Mulconroy Company, Philadelphia, Pa., a corporation of Pennsylvania
Filed Dec. 6, 1960, Ser. No. 74,100
3 Claims. (Cl. 285—256)

This invention relates to couplings for hose and the like, and more particularly to an improved coupling for high pressure hose.

The coupling of the present invention has particular application to high pressure hose which may consist of a rubber or rubberized carcass within which is embodied a metallic reinforcing element or other reinforcement. Broadly, the coupling of the present invention comprises a nipple adapted to be inserted into an end of the hose and a ferrule adapted to be positioned over the outer end of the hose and embrace the nipple portion together with means to engage the hose and prevent the hose from being pulled out from between the ferrule and nipple. Prior ferrule and nipple type couplings were not completely satisfactory for use with extremely high pressure hose and hose having extremely thick wall sections for the reason that they would tend to loosen over a period of use due to the high internal pressures and tension loads on the hose. The present invention overcomes this problem by providing co-acting locking means on the ferrule and nipple forming a restricted throat or zone between the ferrule and nipple within which the hose is gripped and locked upon contraction of the ferrule or expansion of the nipple a predetermined amount to securely anchor the coupling elements on the hose and resist axial displacement of the hose with respect to the coupling. The union provided between the coupling and hose effectively withstands high internal pressures and tension loads on the hose.

Other objectives of the present invention and the various features and details of the operation and construction thereof are hereinafter more fully set forth and described with reference to the accompanying drawings, in which:

FIG. 1 is a side elevational view, partially in section, of a hose end including a coupling made in accordance with the present invention; and FIG. 2 is a side elevational view similar to FIG. 1, showing the hose end and coupling member attached in accordance with the present invention.

Referring now to the drawing, FIG. 1 shows a coupling 10 made in accordance with the present invention fastened to the end of a hose or the like generally designated by numeral 11. The coupling comprises a tubular nipple 12 and a ferrule 13. The nipple 12 has a stem portion 14 which is adapted to fit into an end of the hose, an externally threaded terminal portion 16 for fastening the coupling and hose to a suitable fixture or another coupling, and a radially-extending shoulder 18 intermediate the stem 14 and terminal portion 16. The stem 14 may be formed as shown with a plurality of external circumferential serrations 20 to lock with the inner surface of the hose. The ferrule 13, which in assembly as shown in FIG. 2 embraces the stem 14 of the nipple, has an inturned flange 26, the inner diameter of which is smaller than the outer diameter of the shoulder 18 so that it abuts the latter as shown. The ferrule 13 is provided with a plurality of circumferentially-spaced apertures which, in the present instance, are arranged in two circumferential series 30 and 32 adjacent the respective opposite ends of the ferrule 13.

In accordance with the present invention, means is provided to mount the coupling to an end of the hose in a manner to lock the coupling against axial movement with respect to the hose. This is accomplished by means of co-acting, complementary locking members on the ferrule and nipple which form a restricted throat or zone between the ferrule and nipple within which the hose is gripped upon contraction of the ferrule or expansion of the nipple. To this end, the stem 14 of the nipple may be provided with at least one enlarged annular boss 22 extending radially outward beyond the serrations 20 and in the present instance, two generally spherical bosses 22, 22a are provided which are spaced inwardly from the free end of the stem 14 and shoulder 18, respectively. Inwardly projecting locking members are circumferentially positioned on the ferrule intermediate the bosses 22, 22a which cooperate with the bosses to form a restricted zone for gripping the hose. In the embodiment illustrated, the locking members comprise a plurality of set screws 36 mounted in a circumferential row of tapped or threaded openings 34 in the ferrule intermediate the series of openings 30 and 32 and between the annular bosses 22, 22a. To additionally facilitate locking the coupling to the hose, a plurality of spaced circumferential recesses 38 may be provided on the inner peripheral surface of the ferrule 13 extending axially beyond opposite sides of the tapped openings 34. It will be apparent that the locking members which project into and engage the hose do not have to be set screws such as shown at 36 in the drawings but may be any other type of inserted member or may be inwardly extending projections formed integrally with the outer sleeve or ferrule 13.

In assembling the elements of the coupling of the present invention to an end of a hose or the like, the stem 14 of the tubular nipple 12 is inserted into the end of the hose and then the ferrule 13 is positioned over the hose end and stem 14, so that the flange 26 abuts the shoulder 18, as shown in FIG. 1. It will be noted that the stem 14 is somewhat greater than the inside diameter of the hose so that a slight expansion of the end of the hose results, and a mechanical lock is effected between the serrations 20 of the stem and the inner peripheral surface of the hose. The inside diameter of the ferrule 13 is preferably such as to freely admit the expanded end of the hose, and may provide a clearance space between the outer surface of the hose and the ferrule 13. For high pressure hose of the type illustrated, comprising a rubberized carcass 42 within which is embodied a metallic or other reinforcing element 44, which, in the present instance, consists of braided or wrapped strands embedded within the hose, the clearance between the carcass 42 and the ferrule 13 is about 1/32". Thereafter the set screws 36 are inserted into the tapped openings 34 around the circumference of the ferrule 13. The set screws 36 are preferably of a length that penetrate the outer layer of the hose and touch the metallic element 44 when drawn down to a position flush with the outer surface of the ferrule 13. As shown in FIG. 1, the relation between the position of the screws 36 and the bosses 22, 22a forms a constricted area between the ends of the set screws 36 and the bosses 22, 22a which tends to lock the hose against axial displacement with respect to the coupling.

The ferrule 13 is then compressed radially by a suitable mechanism over the major portion of its length which, in the present instance, is from the inner end thereof, outwardly to a point beyond the boss 22a. In the process of contraction, the outer layer 42 of the hose, which is a displaceable but non-compressible material, flows into the recesses 38 and the openings 30 and 32. The set screws 36 are displaced radially inward and penetrate and engage the inner reinforcing elements 44 of the hose to the extent of the reduction of the ferrule, thereby effecting a greater jam area between the bosses 22, 22a and the ends of the set screws and creating a mechanical interlock between the hose and the coupling. It is important that when the ferrule is contracted that the set screws or other projecting elements do not enter the liner of the hose. The deformation of the reinforcing element 44 materially augments the clamping pressure of the ferrule 13 and stem in uniting the coupling with the hose. Moreover, the compression of the ferrule distorts the screws 36 and the openings 34 axially to an oval cross-section, thereby preventing the screws from working themselves free. It is to be noted that the screws 36 are of such length and are turned in to such an extent before the compressing operation is performed that no part of the outer end of the screws projects about the outer surface of the ferrule or sleeve 13 and, further, that there are no exterior projections on the smooth ferrule to interfere with the compressing operation. The compressing operation is conveniently performed by axially movable die-like elements similar to those shown in Walsh et al. 2,978,263, assigned to the same assignee as the present application.

One form of hose coupling made in accordance with the present invention was secured to regular hydraulic two inch hose having an external diameter of 2¾". This provided a ⅜" wall thickness and when the ferrule was compressed radially the set screws 36 projected into the hose wall 3/16 of an inch. This hose was tested with an internal pressure of 4800 p.s.i. without failure of the hose or coupling. In another test made, 2" reinforced hose having an external diameter of 5¾" was tested with the coupling of the present invention. In this form, the inward projections of the ferrule projected ¾ of an inch into the hose body when the ferrule was compressed and interlocked with the reinforcing elements of the hose. This hose was tested with an internal pressure of 15,000 p.s.i. without failure of the hose or coupling.

Accordingly it is apparent that the present invention provides a coupling suitable for high pressure hose, which may be easily secured in place on the end of a hose and provides an effective bond between the coupling and the hose which resists axial displacement between the hose and the coupling, and withstands high internal pressures in the hose.

While a particular embodiment of the present invention has been illustrated and described herein, it is to be understood that changes and modifications may be incorporated within the scope of the following claims:

I claim:

1. A coupling for a high-pressure hose having an inner and an outer covering layer of resilient flowable non-compressible material, such as rubber, and an intermediate reinforcing layer of a harder stronger material, the hose having all layers extending to the end in the coupling assembly, comprising in combination with the said hose, a tubular nipple having a hose supporting stem portion provided with a radial annular flange shoulder at its inner end engaged by the end of the hose, the stem portion extending into the end of the hose, said nipple stem portion having external grooves and ridges with material of the inside covering layer of the hose compressed into the grooves, said nipple stem portion also having at least one broad, high, rounded, annular boss of considerably greater diameter than said ridges and being spaced inwardly from the outer end of the nozzle stem portion, a ferrule surrounding the outer covering layer of the hose and having an inwardly extending annular flange engaged behind the flange shoulder on the nipple, said ferrule having circumferential recesses spanning the zone above and at each side axially of annular boss with material of the outside covering layer of the hose compressed into the recesses, said ferrule being smooth on its outside surface from its outer end adjacent the end of the nipple stem back for a distance inward beyond said annular boss of the stem portion and having an annular series of tapped holes located axially inwardly beyond but near said annular boss, headless screws in said tapped holes with their outer ends clear of the outer smooth surface of the ferrule and their inner ends extending through the outside covering layer of the hose and engaging in depressions in said layer of reinforcing material, said ferrule from the outer end inward for a distance beyond the annular series of screws having an inner diameter smaller than the normal outside diameter of the hose over the outer covering layer.

2. A hose coupling as set forth in claim 1, in which said nipple stem portion has a second annular boss thereon located inwardly at a distance from the first said annular boss and also inwardly of said series of screws but beneath the outer portion of the ferrule which is of smaller diameter than the normal outside diameter of the hose.

3. A coupling for a high-pressure hose having an inner and an outer covering layer of flowable non-compressible material, such as rubber, and an intermediate reinforcing layer of harder stronger material, the hose having all layers extending to the end in the coupling assembly, comprising in combination with said hose, a tubular nipple having a hose supporting stem with an outer annular flange at its inner end engaged by the end surface of the full thickness wall of the hose, the stem having an outside diameter larger than the normal inside diameter of the hose, said stem having intermediate its ends at least one high, rounded, annular boss having an outside diameter considerably greater than the outside diameter of the stem on either side axially thereof, a ferrule surrounding the outer covering layer of the hose and having an inwardly extending annular flange engaged behind the annular flange on the nipple, said nipple being smooth on its outside surface from its outer end adjacent the outer end of said stem back for a distance inward beyond said annular boss of the stem and having an annular series of holes located axially inwardly of but near said annular boss, radial members in said holes with their outer ends disposed inside the outer smooth surface of the ferrule and with their inner ends extending through the outside covering layer of the hose and into depressions in said layer of reinforcing material, said ferrule from the outer end inward for a distance beyond the annular series of screws having an inner diameter which is smaller than the normal outside diameter of the hose over the outer covering layer and with the hose wall beneath the smaller diameter portion of the ferrule under high compression and the holes for said radial members being oblong axially and tightly gripping said radial members.

References Cited in the file of this patent

UNITED STATES PATENTS

| | | |
|---|---|---|
| 591,468 | Gold | Oct. 12, 1897 |
| 1,971,105 | Hartman | Aug. 21, 1934 |
| 2,216,839 | Hoffman | Oct. 8, 1940 |
| 2,314,000 | Lusher et al. | Mar. 16, 1943 |
| 2,463,293 | Mentel | Mar. 1, 1949 |
| 2,797,111 | Beazley | June 25, 1957 |
| 2,810,594 | Walsh et al. | Oct. 22, 1957 |
| 2,978,263 | Walsh et al. | Apr. 4, 1961 |